United States Patent [19]

Dufresne de Virel et al.

[11] Patent Number: 4,905,936

[45] Date of Patent: Mar. 6, 1990

[54] AIRBORNE OPTICAL SIGHTING DEVICE MOVING AT HIGH SPEED

[75] Inventors: Francois Dufresne de Virel; Michel Poliet, both of Paris; Gérard Laruelle, Le Plessis Robinson; Jacques Coste, Igny; Claude Sans, Massy, all of France

[73] Assignees: Thomson-Csf, Paris; Office National d'Etudes et al Recherches Aerospatiales (Onera), Chatillon sous Bagneux, both of France

[21] Appl. No.: 699,339

[22] Filed: Nov. 30, 1984

[30] Foreign Application Priority Data

Dec. 2, 1983 [FR] France .................... 83 19318

[51] Int. Cl.⁴ .................... B64C 1/38; B64C 1/00
[52] U.S. Cl. .................... 244/130; 244/3.1; 244/129.1
[58] Field of Search .................... 244/3.16, 3.1, 199, 244/123, 129.1, 130

[56] References Cited

U.S. PATENT DOCUMENTS 3,507,463  4/1970  Kuntz .................... 244/199
4,311,289  1/1982  Finch .................... 244/130

OTHER PUBLICATIONS

AVG-DEM Actualites, No. 1, Jan. 1982, p. 1.

Primary Examiner—Charles T. Jordan
Attorney, Agent, or Firm—Cushman, Darby & Cushman

[57] ABSTRACT

The optical sighting device makes it possible to increase the quality of optical transmission by preventing turbulences from forming in the field of vision at high speed, by means of an airstream-deflecting device which is mounted in the turbulence formation zone and which has a profile in the form of a stem-post to dispel the air-streams laterally. In the case of transparent plane wall via which vision takes place in this zone, the deflecting device can consist of an attached plates which is connected to or located in the vicinity of the wall.

13 Claims, 1 Drawing Sheet

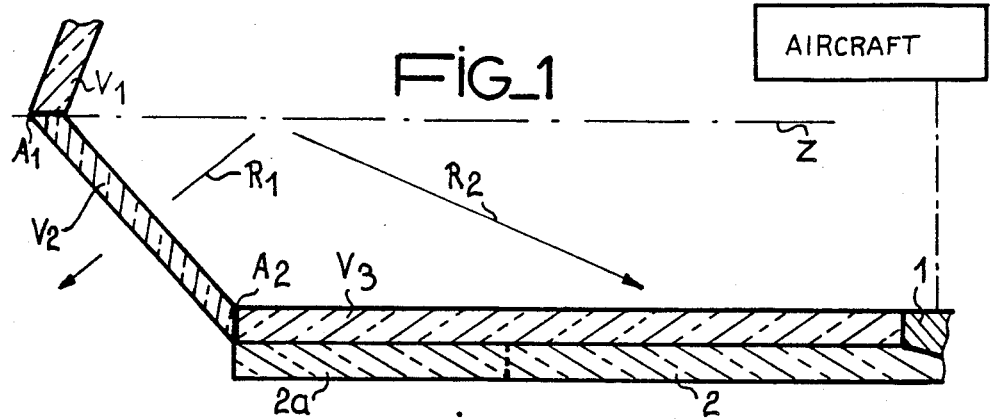
FIG_1
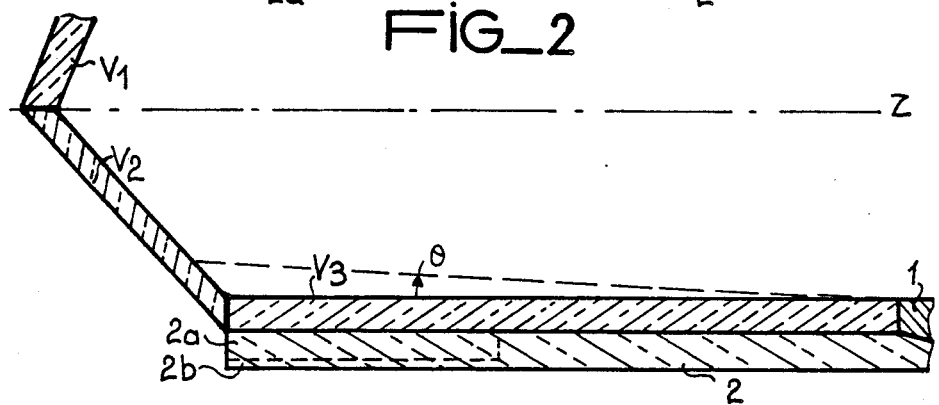
FIG_2
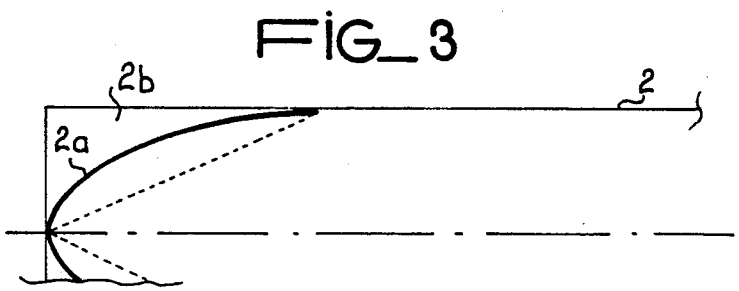
FIG_3
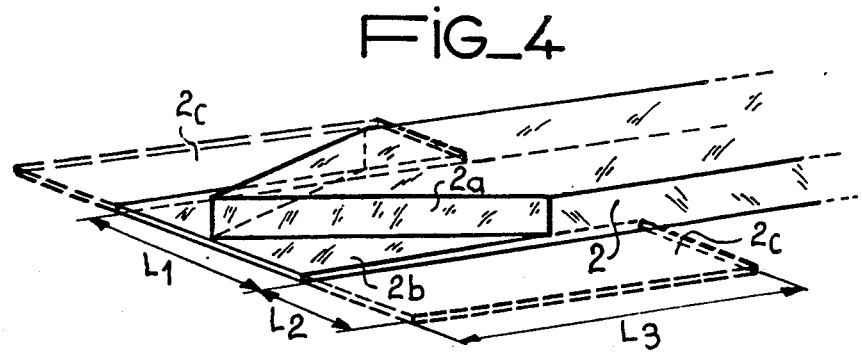
FIG_4

AIRBORNE OPTICAL SIGHTING DEVICE MOVING AT HIGH SPEED

BACKGROUND OF THE INVENTION

The present invention relates to improvements to airborne optical sighting devices which can move at high speed.

Fluids present a resistance to the movement of bodies immersed in them. This resistance is essentially a function of the type of fluid, the relative speed of the body in relation to the fluid and the shape of the body. It results, in particular, to a consumption of energy. Thus, for aircraft which must move at high speed, it is necessary to give the fuselage and the various projecting parts streamlined forms, called aerodynamic forms, so as to present the least possible resistance to forward movement. A body with poor streamlining, for example one which has slope discontinuities, causes an increase in the drag which essentially results from the occurrence of zones of broken-down flow, in which eddies and vortices arise.

Among the projecting elements are radomes or transparent fairings for housing various optical sighting systems. By optical sighting are meant both laser or other emitter systems and photoreceiver systems. These systems can serve, in particular, for target reconnaisance or for missile guidance; they are accommodated on the aircraft or arranged in a nacelle (called a "pod") which is usually fastened to the lower wing surface of the aircraft.

Because of the maneuverability of the aircraft, especially of the fighter type, optical sighting becomes necessary over a considerable field extending from the front of the aircraft to the rear and over the sides. Thus, the angular extent of the field in the longitudinal plane of the aircraft can be, for example, 120° or more. A good compromise is obtained, at the present time, when optical transmitting and/or receiving means are arranged in the nose of a pod. With this configuration, as in the case of the radomes and fairings already mentioned, downward and rearward sighting makes it necessary to ensure that the beam assumes slightly inclined positions relative to the transparent wall through which it passes over a great length. In proportion to the increase in speed, however, this wall becomes the location for zones of turbulent flows which impede the passage of the light radiation, and this results in a poor quality of the video image detected.

Moreover, if the speed parameter is considered, there is no doubt that the thicknesses of these turbulent zones increase with the speed, and when the transsonic range is reached interactions with shock waves intensify these disturbances even further.

The object of the invention is to overcome such disadvantages by reducing these turbulence phenomena as much as possible at the level of the transparent wall, in order to maintain the convenience of optical sighting.

It is known, in aeronautics, to interpose a connecting piece between an air scoop and the wing or fuselage, the front shape of this connecting piece being designed to eliminate low-energy layers of air which are generated along the wall upstream of the air scoop and which would impair the performances of the engine. This piece has a front profile in the form of a stem-post; it forms a limiting-layer trap and thus ensures the supply of air to the engine with a sufficient energy. By limiting layer is meant the fluid thickness which rests against a wall and in which the viscous effects are revealed as a result of the movement of the body.

This solution is adopted here to perform a different function, that is to say to reduce the thickness of the limiting layer along the optical walls as much as possible, so that optical sighting, particularly towards the rear, can be carried out under good conditions.

SUMMARY OF THE INVENTION

According to the invention, it is proposed to produce an airborne optical sighting device comprising transparent walls in longitudinal and lateral zones to allow optical sighting in a desired effective field, the said field among other things extending underneath and towards the rear of the fuselage, the said optical sighting device being characterised in that means are provided to eliminate the effeccts on optical sighting and image perception of the disturbances generated by turbulences present in the limiting layer along the said transparent walls during movement at high speed, the said means comprising an airstream-deflecting device with a piece made of material transparent to the radiation used and in the form of a stem-pose towards the front, so as to ensure lateral shedding of the airstreams during the longitudinal movement of the carrier vehicle and thereby reduce and even eliminate the said limiting layer.

BRIEF DESCRIPTION OF THE DRAWINGS

The particular features and advantages of the present invention will emerge from the following description given by way of example by means of the attached Figures in which:

FIG. 1 shows an optical sighting device equipped with a deflecting device, according to the invention shown with a schematic block representing an aircraft;

FIG. 2 shows an alternative embodiment of the sighting device according to FIG. 1;

FIG. 3 shows a partial view illustrating various possible methods of producing the deflecting device;

FIG. 4 shows in perspective an embodiment of the deflecting device.

DESCRIPTION OF PREFERRED EMBODIMENTS

To solve the problems of target reconnaissance or missile guidance, it is usually necessary to accommodate in the aircraft or in a pod fastened under the aircraft optical means (photographic instrument, camera, etc.) which are or are not combined with target designation means (laser).

Because of the maneuverability of the aircraft, optical sighting is necessary over an extensive field: towards the front of the aircraft, on the sides, underneath, but also towards the rear. As recalled above, a good compromise is obtained, at the present time, with optical means arranged in the front part or nose of a pod fastened under the fuselage of the aircraft. Such a configuration is envisaged below, but not exhaustively.

With this configuration, the rear sighting symbolized by a ray R2 in FIG. 1 makes it necessary to ensure that the beam becomes slightly inclined relative to the longitudinal axis Z and therefore to the body 1 of the pod. In fact, this body constitutes a housing which generally has an elongate form of axis Z, and the nose is provided with transparent walls V1 to V3, to allow optical sighting in the desired effective field. This field can extend in the longitudinal plane considered in FIG. 1, for example between the direction Z towards the front and the limiting rearward direction R2 passing through the transparent wall V3. Laterally, the walls V1 to V3 have sufficient dimensions to produce the desired angular value of the field in this direction. These walls can consist, as shown, of plane transparent plates made of glass or another material and inclined differently relative to the axis Z to form the front part V1-V2 and the lower part V3; the latter allows sighting to be carried out underneath the pod and towards the rear and is considered parallel to the axis Z or slightly inclined relative to this direction by an angle $\theta$ as shown in FIG. 2. The edges thus formed at A1 and A2 at the junction of the plates are the location for air breakdown zones, particularly as regards movement at high speed; at transsonic speeds, shock waves can be generated in the region A2 of connection between the nose and the generally cylindrical body of the pod, and these affect the optical sighting. These disturbances, initiated in this way at the level of the nose, result in a turbulent flow which is generated along the outer wall of the strip V3, this limiting layer having an increasing thickness in proportion to the rearward movement. Since the thicknesses of the turbulent zones increase at the same time as the speed, when transsonic speeds are reached, the interactions with the shock waves intensify the disturbing effect even further.

It will thus be seen that rear-sighting rays, such as R2, have to pass over a greater length of the transparent wall V3 and zones of turbulent flow, and this latter point above all affects, in particular, the quality of light transmission and especially that of an image detected by the optical means on board.

The purpose of the proposed arrangement is, in particular, to reduce and even practically eliminate, in the effective zone for optical sighting, the thickness of this limiting layer which is the location of zones of turbulence. It makes use of a piece in the form of a stempost towards the front, to deflect the airstreams laterally on either side of the glazed zone V1 to V3 and thus counteract the effects of breakdowns, at the same time preventing or limiting the formation of a turbulent limiting layer on the outer wall of the strip V3. This piece 2 must not impede the transmission of light radiation through the wall V3 and is therefore likewise made of transparent material, where a design, for example, in a solid version, like those illustrated, is concerned. This material is selected so as to have the desired optical quality for utilizing the sighting device.

According to the simple version of FIG. 1, the piece 2 constituting an airstream-deflecting device is formed by a transparent plate which has parallel faces and is mounted on the outer plane surface of the transparent wall V3 and the front of which is in the form of a stem-post 2a.

According to a more elaborate version illustrated in FIG. 2 and FIG. 4, a thin plate 2b (attached or obtained by machining) is located underneath the part 2a in the form of a stem-post, in order to channel the flow more effectively and further increase the effectiveness of the assembly. This plate 2b can have the same lateral dimension L1 as the plate 2 towards the rear, this dimension corresponding at least to that of the wall V3 of the pod.

Alternatively, the plate 2b possesses lateral wings 2c which can be attached and the dimensions L2, L3 and shape of which are determined so as to supplement the function of the deflecting means 2, in such a way that the marginal vortices are generated outside the glazed zone V3. The rectangular form of these elements 2c, which is shown in FIG. 4, must be considered as an example. These wings 2c are located outside the effective field of optical sighting and can therefore be made of a material which is non-transparent to the radiation used.

It emerges that the deflecting device 2 can be produced in many ways including those illustrated, the essential feature being to provide front surfaces forming a stem-post to dispel the air laterally and prevent troublesome turbulences from forming. In particular, these front surfaces can consist of a dihedron, as indicated by dotted lines in the plan view of FIG. 3, or of curved surfaces providing an aerodynamic profile (the version indicated by an unbroken line). Moreover, in the vertical direction (perpendicular to the plane of FIG. 3), these surfaces can be inclined to form a lower base wider than that in contact with the wall V3 and to orient the direction in which the airstreams are dispelled laterally.

The assembly can likewise be considered as being designed so that the deflecting device 2 has a lower surface inclined relative to the axis Z in a direction going away from this axis, during movement towards the rear, in order to emphasize even further the effect of breakdown of the limiting layer.

The advantage of such an airstream deflecting device is to improve rear sighting without disturbing lateral sighting, by preventing the formation of turbulences in the field of vision at high speeds of movement. It is possible, in particular, to profile the stem-post according to the direction of the beam, to minimize the disturbance which could be caused by this profile in the field of vision as a result of a mask effect.

Among the possible alternative forms, it is also possible to consider the assembly consisting of the wall V3 and the deflecting device 2 as being made in one piece, machined from the material of the wall V3. As regards a separate piece 2, it is also possible to envisage a method of assembly which makes it integral with the wall V3, so that a thin strip of air remains between the opposing surfaces 2 and V3. The essential thing is to adhere to the external geometry in order to maintain the aerodynamic profile of the aircraft as a whole.

What is claimed is:

1. An optical sighting device adapted to be fastened under the fuselage of an aircraft comprising:
    a plurality of transparent walls extending in longitudinal and lateral zones, to allow optical sighting in a desired effective field, the said field among other things extending underneath and towards the rear of the aircraft, and means for eliminating the effects on optical sighting and image perception of the disturbances generated by turbulences present in a limiting layer along the said transparent walls during movement at high speed, the said means comprising an airstream-deflecting device with a piece made of a radiation transparent material and in the form of a stem-post towards the front, so as to ensure the lateral shedding of the airstreams during longitudinal movement and thereby at least reduce the said limiting layer.

2. A sighting device as claimed in claim 1, in which the turbulences arise along the outer surface of one of the said transparent walls, and the deflecting device is made integral with this wall.

3. A sighting device as claimed in claim 2, in which the said transparent wall is plane, the said outer surface is plane, and in that the deflecting device is made in the form of a plate attached by means of a surface to the said plane wall.

4. A sighting device as claimed in claim 2, in which the said transparent wall is plane, the said outer surface is plane, and in that the deflecting device is made in the form of a plate located in the vicinity of the said plane wall.

5. A sighting device as claimed in claim 2, wherein the deflecting device also possesses a thin plate, the part in the form of a stem-post being between this thin plate and the said transparent wall.

6. A sighting device as claimed in claim 2, wherein the profile of the stem-post is that of a dihedron.

7. A sighting device as claimed in claim 2, characterized in that the profile of the stem-post is curved and of the aerodynamic type.

8. A sighting device as claimed in claim 2, wherein the profile of the stem-post is inclined to minimize the mask effect for light transmission.

9. A sighting device as claimed in claim 2, wherein the said aircraft has a pod fastened under the fuselage of an aircraft, and a lower transparent wall is the location of the said turbulences, the said deflecting device being arranged to ensure rear vision.

10. A sighting device as claimed in claim 9, wherein the deflecting device and the associated wall are inclined relative to the axis of the pod.

11. A sighting device as claimed in claim 2, wherein the deflecting device and the said wall with which it is associated are made in one single piece.

12. A sighting device as claimed in claim 5, wherein the thin plate is extended laterally in the direction of movement by means of matching elements which constitute lateral wings, to reinforce the deflecting effect.

13. A sighting device as claimed in claim 12, wherein the lateral wings are outside the effective field and are made of a material non-transparent to the radiation used.

* * * * *